United States Patent
Fukuda

(10) Patent No.: US 7,865,067 B2
(45) Date of Patent: Jan. 4, 2011

(54) RECORDING APPARATUS AND METHOD, REPRODUCTION APPARATUS AND METHOD, AND RECORDING MEDIUM

(75) Inventor: Hideki Fukuda, Nara (JP)

(73) Assignee: Panasonic Corporation, Osaka (JP)

( * ) Notice: Subject to any disclaimer, the term of this patent is extended or adjusted under 35 U.S.C. 154(b) by 1336 days.

(21) Appl. No.: 11/370,855

(22) Filed: Mar. 9, 2006

(65) Prior Publication Data

US 2006/0210241 A1 Sep. 21, 2006

(30) Foreign Application Priority Data

Mar. 15, 2005 (JP) .............................. 2005-072530

(51) Int. Cl.
H04N 9/885 (2006.01)
H04N 5/76 (2006.01)
(52) U.S. Cl. ...................... 386/267; 386/295
(58) Field of Classification Search .................. 386/95, 386/46, 124, 125–126
See application file for complete search history.

(56) References Cited

U.S. PATENT DOCUMENTS 6,078,727 A 6/2000 Saeki et al.
6,553,180 B1 * 4/2003 Kikuchi et al. ................ 386/95
2002/0122658 A1 9/2002 Fukuda et al.

FOREIGN PATENT DOCUMENTS

| CN | 1374795 | 10/2002 |
|---|---|---|
| JP | 3028517 | 2/2000 |
| JP | 2001-103428 | 4/2001 |
| JP | 2004-227693 | 8/2004 |

* cited by examiner

Primary Examiner—Peter-Anthony Pappas
Assistant Examiner—Tat Chio
(74) Attorney, Agent, or Firm—Bacon & Thomas, PLLC

(57) ABSTRACT

A recording apparatus for recording an input signal on a data unit basis and management information of data units of the input signal onto a recording medium, the recording apparatus includes a recording mode determination unit for determining a recording mode representing a recording time of the input signal onto the recording medium; and a time length determination unit for determining a time length of each data unit, wherein a minimum time length of each data unit is determined by the recording mode.

15 Claims, 10 Drawing Sheets

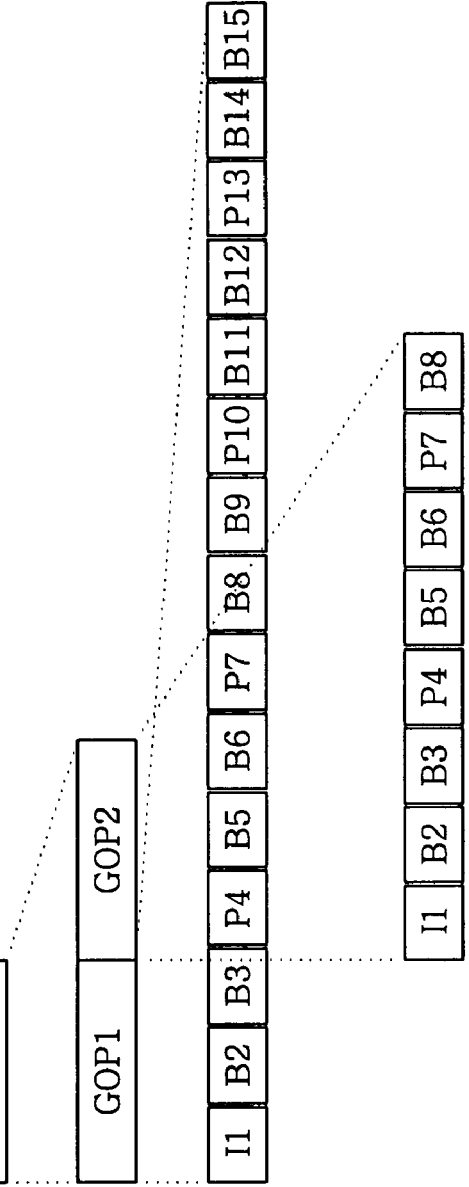
FIG.7A
FIG.7B

RECORDING APPARATUS AND METHOD, REPRODUCTION APPARATUS AND METHOD, AND RECORDING MEDIUM

FIELD OF THE INVENTION

The present invention relates to a recording apparatus and method for recording input signals such as television signals on a recording medium, a reproduction apparatus and method, and a recording medium thereof.

BACKGROUND OF THE INVENTION

With regard to a recording apparatus for recording conventional video signals on a recording medium, there is disclosed an apparatus which records time map information including at least one of a recording address and reproduction time information of each data unit while the video signals are recorded on a data unit basis (see, for example, Japanese Patent No. 3028517, pages 7 to 9, FIG. 9 and Japanese Patent Laid-open Application No. 2001-103428, pages 13 and 15). The time map information allows one to have random access to the recorded video signals.

As a method for recording video signals onto a DVD-RAM medium, there is provided a DVD video recording standard (hereinafter, referred to as a 'DVD-VR standard'). The DVD-VR standard requires that video signals are recorded in units of video object units (hereinafter, referred to as 'VOBUs'); and time map information of each VOBU (VOBU map information) is recorded. A reproduction time length of each VOBU is required to be within a range from 0.4 to 1.0 seconds.

In case of recording video signals on a DVD-R medium, recording is carried out in accordance with a DVD-Video standard. The DVD-Video standard also defines VOBUs; and also requires that a reproduction time length of each VOBU is set to be within a range from 0.4 to 1.0 seconds same as the DVD-VR standard.

Further, digital image signals are generally recorded as a video stream derived by compressing data in compliance with an MPEG encoding standard. The MPEG encoding standard defines the intra-frame encoding (I-pictures), the predictive-encoding (P-pictures) and the bidirectionally predictive-encoding (B-pictures). Herein, a frame group led by an I-picture is called the Group of pictures (hereinafter, referred to as 'GOPs'). In order to reproduce the video stream by random-access, reproduction starts from the I-picture that can be independently reproduced. Namely, access on a GOP unit basis can be realized.

Meanwhile, since the DVD-VR standard requires that each VOBU includes at least one GOP, access on a VOBU unit basis can be also realized by using VOBU map information. Further, even while the VOBU map information is recorded on a recording medium, during a reproduction process, the VOBU map information is transferred to an internal memory so that it can be read out from the memory during random-access. For the random-access, a reproduction time length of each VOBU is set to be about 0.5 seconds.

Meanwhile, a DVD recorder can record up to 2 hours of video signals on a 4.7 GB DVD-RAM medium in a standard mode (hereinafter, referred to as 'SP mode'). Further, it can record up to 4 hours of video signals in a long play mode (LP mode). Those recording modes can be realized by controlling a compression rate (bit rate) in compliance with MPEG specifications. Since the bit rate in the SP mode is 5 Mbps and that in the LP mode is 2.5 Mbps, a recording of video signals in a long play mode can be realized by lowering the bit rate.

However, although the long play recording mode can be realized by lowering the bit rate in case of MPEG encoding in such as DVDs, there has been a problem that a memory size for recording the time map information increases since the longer the recorded video signals are, the larger a total size of the time map information becomes.

For example, when a data unit is 0.5 seconds long and a time information size of each data unit is set to be 3 bytes, the relationship between the recording time and the total data size of the time map information is shown in Table 1.

TABLE 1

| Recording time mode [hours] | Data size of time map information [bytes] |
|---|---|
| 2 | 43,200 |
| 4 | 86,400 |
| 8 | 172,800 |
| 12 | 259,200 |
| 16 | 345,600 |

For example, a 200 Kbytes memory is sufficient to record up to 8 hours of video signals whereas a memory of at least 345 Kbytes is required to record up to 16 hours of video signals.

On the other hand, if a size of a time map information storage memory installed in the recording apparatus is 200 Kbytes, recording of the video signals can be performed only for about 8 hours to prevent the time map information storage memory from being overflowed.

Further, there has been a problem that when reproducing video signals recorded in a long play mode on a recording medium, the video signals cannot be fully reproduced due to an overflow in the time map information storage memory.

Furthermore, since recording formats vary depending on types of recording media, a memory size for storing the time map information can be varied accordingly, thereby resulting in a problem that a maximum time for recording varies depending on the types of the recording media.

The present invention is contrived on the basis of the aforementioned problems and it is, therefore, an object of the present invention to provide a recording apparatus and method capable of recording of video signals in a long play mode without overflowing a memory of time map information, a reproduction apparatus and method, and a recording medium thereof.

SUMMARY OF THE INVENTION

In accordance with one aspect of the present invention, there is provided a recording apparatus for recording an input signal on a data unit basis and management information of data units of the input signal onto a recording medium, the recording apparatus including: a recording mode determination unit for determining a recording mode representing a recording time of the input signal onto the recording medium; and a time length determination unit for determining a time length of each data unit, wherein a minimum time length of each data unit is determined by the recording mode.

Accordingly, by determining the minimum time length of each data unit based on the recording mode and making the minimum time length of each data unit longer as the recording time becomes longer, a recording of video signals in a long play mode can be realized without increasing a total data size of the management information which manages the data units.

In accordance with another aspect of the present invention, there is provided a recording method for recording an input signal on a data unit basis and management information of data units onto a recording medium, the recording method including the steps of: determining a recording mode representing a recording time of the input signal onto the recording medium; and determining a time length of each data unit, wherein a minimum time length of each data unit is determined by the recording mode.

In accordance with still another aspect of the present invention, there is provided a recording medium for recording an input signal on a data unit basis and management information of data units, wherein a minimum time length of each data unit is determined by a recording mode representing a recording time of the input signal.

In accordance with another aspect of the present invention, there is provided a reproduction apparatus for reproducing an input signal from a recording medium, wherein the recording medium stores the input signal on a data unit basis and management information of data units of the input signal, the reproduction apparatus including: a detection unit for detecting a recording mode representing a recording time of the input signal onto the recording medium; and a reproduction start time determination unit for determining a reproduction start time by executing random-access, wherein the input signal is reproduced by randomly accessing the data units based on a minimum time length of each data unit determined by the recording mode.

In accordance with still another aspect of the present invention, there is provided a reproduction method for reproducing an input signal from a recording medium, wherein the recording medium stores the input signal on a data unit basis and management information of data units of the input signal, wherein the input signal is reproduced by randomly accessing the data units based on a minimum time length of each data unit determined by a recording mode representing a recording time of the input signal.

BRIEF DESCRIPTION OF THE DRAWINGS

The above and other objects and features of the present invention will become apparent from the following description of preferred embodiments given in conjunction with the accompanying drawings, in which:

FIGS. 7A and 7B respectively illustrate exemplary VOBU configurations in a recording apparatus of the embodiment 2 in accordance with the present invention;

DETAILED DESCRIPTION OF THE PREFERRED EMBODIMENT

Embodiment 1

Figure 1:
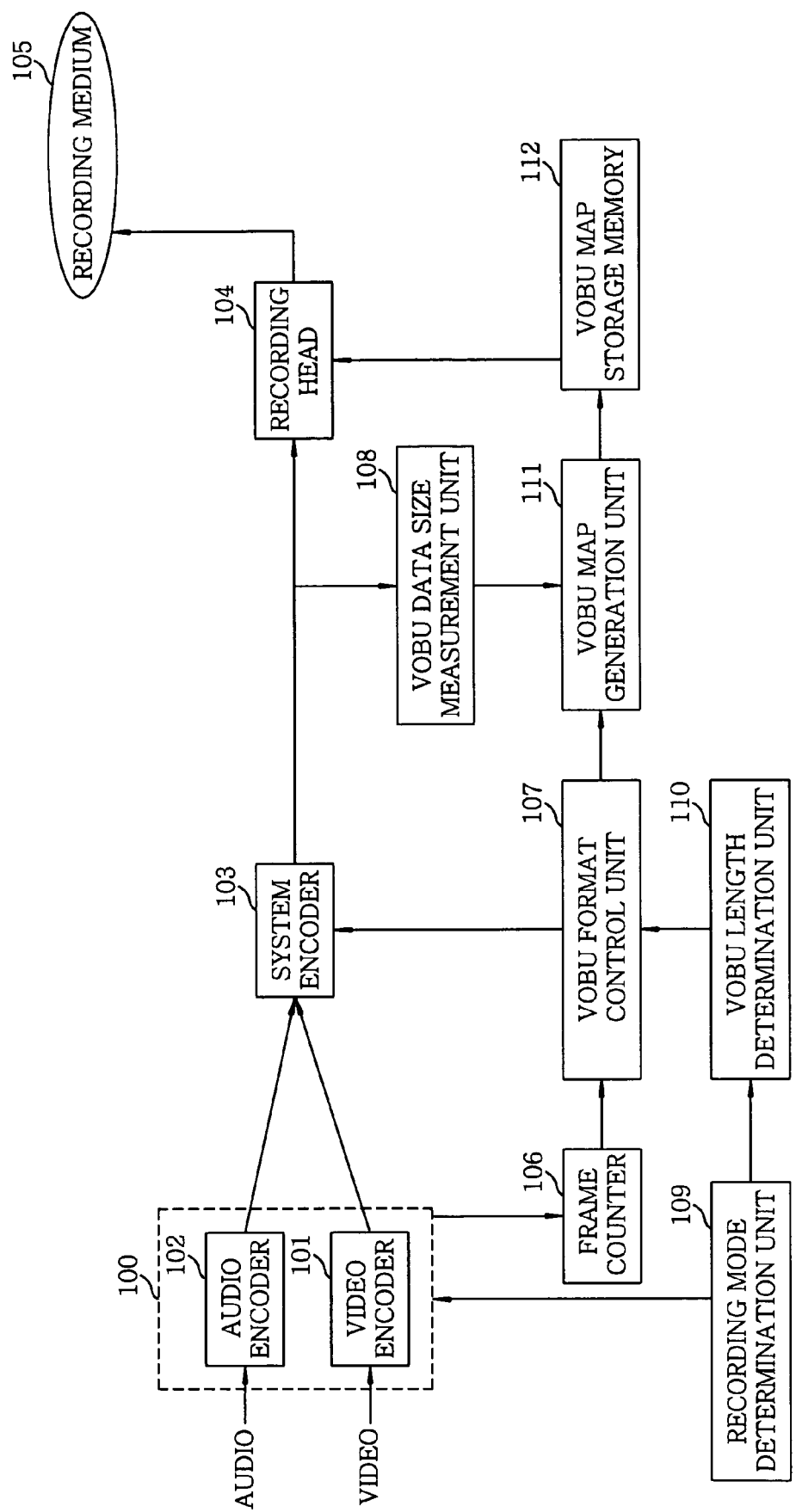
FIG. 1 is a block diagram of a recording apparatus of an embodiment 1 in accordance with the present invention.

FIG. 1 shows a block diagram of a recording apparatus of an embodiment 1 in accordance with the present invention.

The recording apparatus which includes encoder 100 having video encoder 101 and audio encoder 102, system encoder 103, recording head 104, frame counter 106, VOBU format control unit 107, VOBU data size measurement unit 108, recording mode determination unit 109, VOBU length determination unit 110, VOBU map generation unit 111 and VOBU map storage unit 112 records input audio and video signals onto recording medium 105.

Video encoder 101 encodes the input video signals by compressing them in compliance with an MPEG encoding method to generate a video stream. In a same manner, audio encoder 102 encodes the input audio signals by compressing them in compliance with an MPEG Audio layer 2 encoding method to generate an audio stream. System encoder 103 multiplexes the video and the audio stream into a system stream. Frame counter 106 counts the number of frames included in each VOBU.

VOBU format control unit 107 instructs system encoder 103 to form a VOBU if the number of frames reaches a minimum time length of each VOBU. System encoder 103 generates the system stream in the VOBU unit basis following the received instruction from VOBU format control unit 107. In this embodiment, each VOBU is configured to be formed by including one or more GOPs whose total number of frames becomes equal to or greater than the minimum time length, wherein the total number of the frames is obtained by adding up the number of frames in the GOPs since each VOBU includes one or more GOPs.

Recording mode determination unit 109 is an interface which determines a recording mode representing a recording time by an instruction from a user. For example, one of 2, 4, 8, 12 and 16 hours recording modes is selected on one side of recording medium 105. A compression rate (bit rate) of video encoder 101 is determined on the basis of the selected recording mode. Table 2 shows an example of the relationship between the recording mode and a corresponding bit rate.

TABLE 2

| Recording time mode [hours] | Video bit rate [Mbps] |
| --- | --- |
| 2 | 5 |
| 4 | 2.5 |
| 8 | 1.25 |
| 12 | 0.8 |
| 16 | 0.6 |

VOBU data size measurement unit 108 measures a data size of each VOBU to inform it to VOBU map generation unit 111. VOBU map generation unit 111 generates VOBU map information by using the data size of each VOBU received from VOBU data size measurement 108 and a VOBU time length received from VOBU format control unit 107. The VOBU map information is to relate a VOBU reproduction time with a recording address; and is about 3 bytes long for each VOBU. Reproduction time information of each VOBU is created by using a length of the VOBU reproduction time while the recording address thereof is created by using the data size of each VOBU. The created VOBU map information is stored in VOBU map storage memory 112 for the time being.

Recording head 104 which records VOBUs and VOBU map information thereof onto recording medium 105 starts recording the VOBU map information stored in VOBU storage memory 112 after completing a recording of all the VOBUs. This is to avoid a problem that a processing time for recording a system stream data (VOBU data) is delayed if recording medium 105 is accessed every time the VOBU map information of several bytes is created.

A recording format of recording medium 105, the VOBU map information and a format of a VOBU will be described below in detail referring to FIGS. 2 and 3.

VOBU length determination unit 110 determines the minimum time length of each VOBU based on the recording mode. Table 3 below illustrates the relationship between the recording time mode and the minimum time length of each VOBU; and provides a corresponding data size of the VOBU map information. In Table 3, the data size of the VOBU map information is calculated by setting map information corresponding to each VOBU to be 3 bytes.

TABLE 3

| Recording time mode [hours] | minimum time length of each VOBU [seconds] | data size of VOBU map information [bytes] |
| --- | --- | --- |
| 2 | 0.5 | 43,200 |
| 4 | 0.5 | 86,400 |
| 8 | 0.5 | 172,800 |
| 12 | 0.75 | 172,800 |
| 16 | 1.0 | 172,800 |

By determining the minimum time length of each VOBU on the basis of the recording time mode of Table 3, it is possible to record in 16 hours recording mode by using VOBU map storage memory 112 having a size of 170 Kbytes (1 Kbyte=1024 bytes).

Further, a minimum time length T of each VOBU can be calculated from the formula: T=R/M×d, where M denotes a size of VOBU map storage memory 112, d denotes a data size of map information corresponding to each VOBU and R denotes a recording time.

Figure 5:
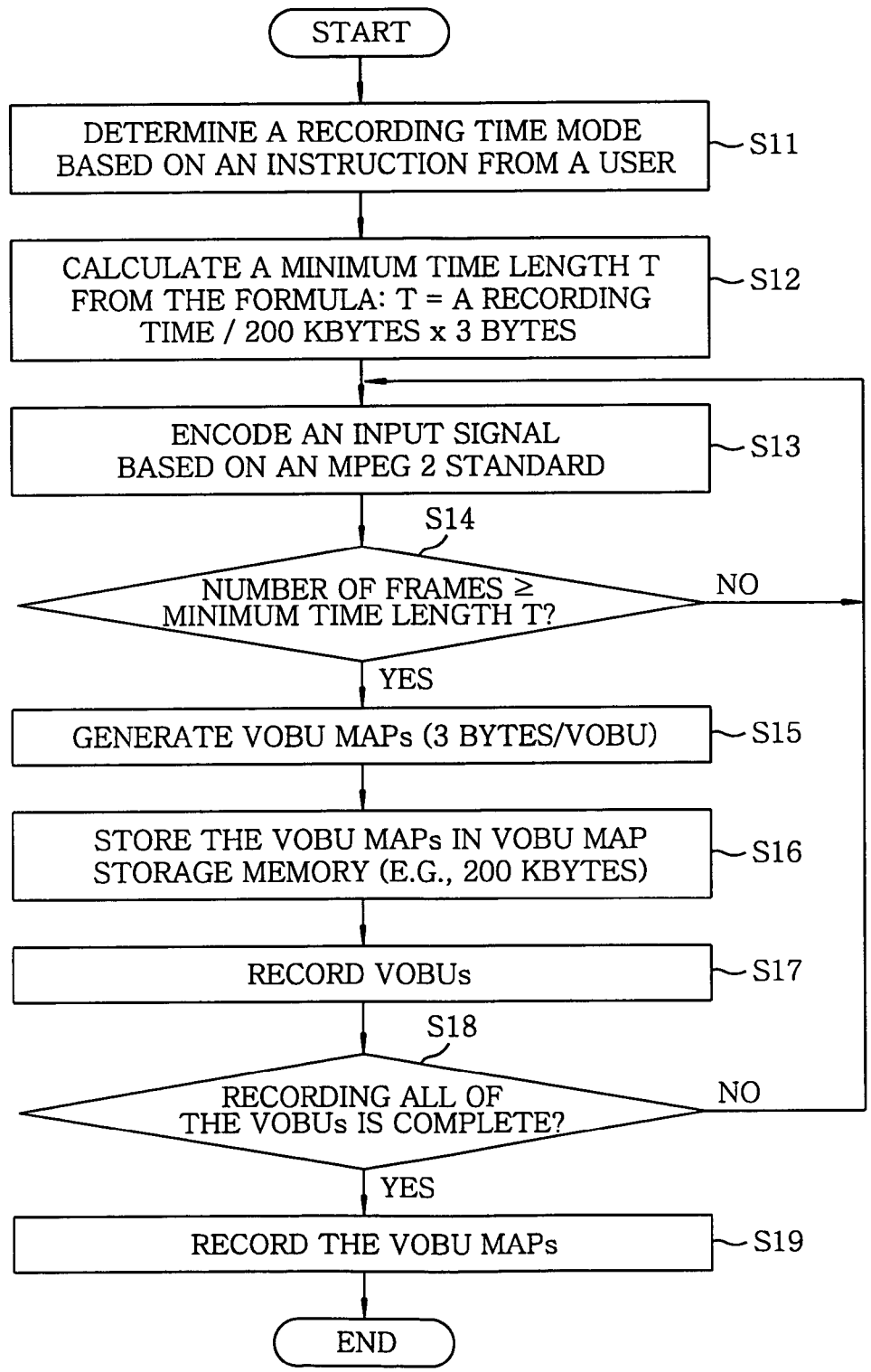
FIG. 5 is a flowchart for explaining a recording method of the embodiment 1 in accordance with the present invention.

FIG. 5 is a flowchart for explaining a recording method of the embodiment 1. As described in FIG. 5, when a recording process starts, recording mode determination unit 109 determines a recording time mode based on an instruction from a user in step S11. VOBU length determination unit 110 determines a minimum time length T of each VOBU based on the recording time mode from recording mode determination unit 109 in step S12. If a total size of map information is set to be 200 Kbytes; and a data size of map information corresponding to each VOBU is set to be 3 bytes, the minimum time length T of each VOBU can be calculated from the formula: T=(a recording time/200 Kbytes)×3 bytes. In step S13, video encoder 101 and audio encoder 102 respectively encode an input video and an audio signal in accordance with an MPEG 2 encoding standard to output an encoded data on the basis of a compression rate (bit rate) decided by the recording time mode from recording mode determination unit 109. In step S14, a VOBU formation is controlled by VOBU format control unit 107. More specifically, VOBU format control unit 107 controls system encoder 103 to form VOBUs by using the number of frames in the encoded data generated from encoder 100, which is counted in frame counter unit 106, and by using the minimum time length T from VOBU length determination unit 110. Each VOBU includes the smallest number of GOPs that make a total length of all frames included in each VOBU not be shorter than the minimum time length T. System encoder 103 outputs a compressed/encoded system stream on a VOBU unit basis in accordance with the instruction of VOBU format control unit 107.

By using the data size of each VOBU received from VOBU data size measurement 108 and a VOBU time length (i.e. 1 frame duration x total frames included in each VOBU) received from VOBU format control unit 107, VOBU map generation unit 111 generates VOBU map information of, for example, 3 bytes/VOBU and stores it in VOBU map storage memory 112 of, for example, 200 Kbytes (steps S15 and S16). Meanwhile, the system stream generated on the VOBU unit basis is recorded in recording medium 105 on the VOBU unit basis by recording head 104 until a recording of all the VOBUs is completed (steps S17 and S18). If the recording of all the VOBUs is completed, recording head 104 starts a recording of the VOBU map information stored in VOBU map storage memory 112 onto recording medium 105. If the recording of the VOBU map information is completed, the recording process is finished.

Figure 2:
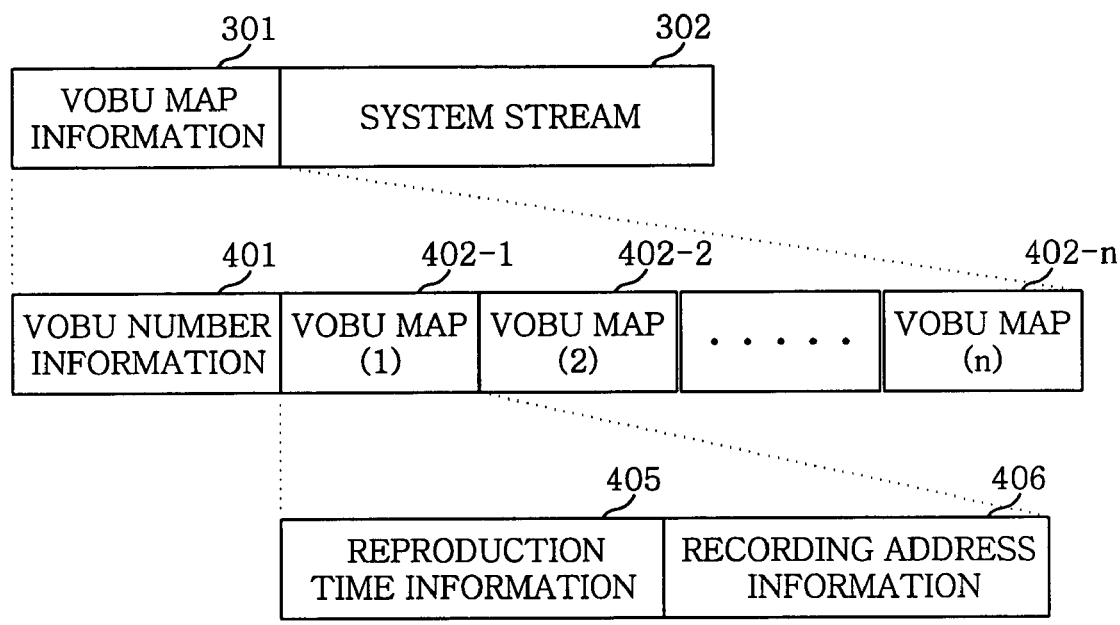
FIG. 2 describes VOBU map information of a recording format for explaining a recording medium in accordance with the present invention.
Figure 3:
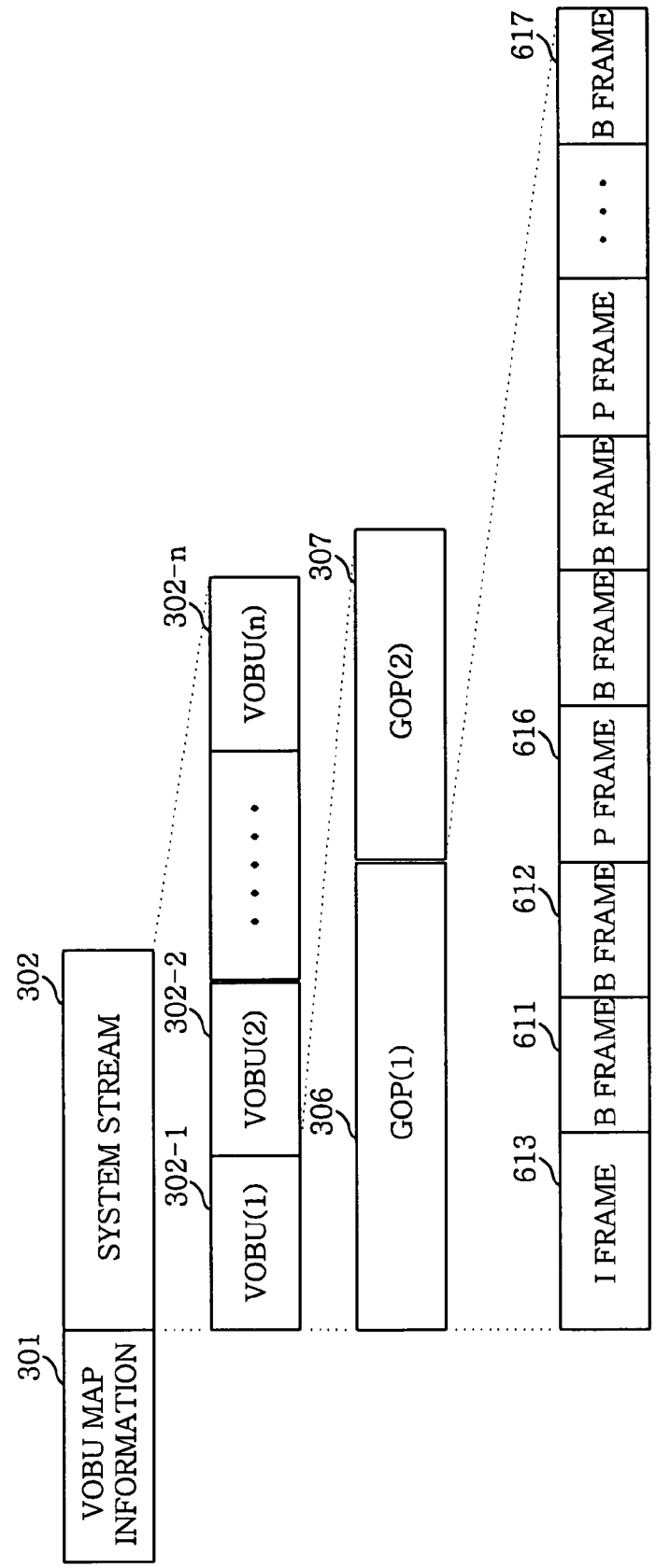
FIG. 3 presents a system stream format of a recording format of a recording medium in accordance with the present invention.

FIGS. 2 and 3 illustrate an exemplary recording format recorded in recording medium 105 of the present invention.

VOBU map information 301 and system stream 302 are recorded in recording medium 105. VOBU map information 301 in FIG. 2 includes VOBU number information 401 and n VOBU maps 401-1, . . . , 402-n. VOBU number information 401 indicates information about the number of VOBUs which form system stream 302. In this example, system stream 302 includes n VOBUS. Each VOBU map, for example, VOBU map (1) 402-1 includes reproduction time information 405 and recording address information 406. Reproduction time information 405 is information regarding a VOBU reproduction time length while recording address information 406 refers to a recording address on an optical disc. Since a recording address corresponding to a time position on a system stream of a target VOBU can be obtained by reading out the VOBU map information, it is possible to randomly access the target VOBU to start reproduction thereof at a desired time. Further, as reproduction time information 405, information for a reproduction time position from the beginning of the system stream can be recorded.

As shown in FIG. 3, system stream 302 includes n VOBUs 302-1 to 302-n each of which, for example, VOBU (1) 302-1, contains GOP (1) 306 and GOP (2) 307.

Herein, although each VOBU includes two GOPs, each VOBU can be composed of one GOP; but the number of GOPs is not limited.

Figure 4A:
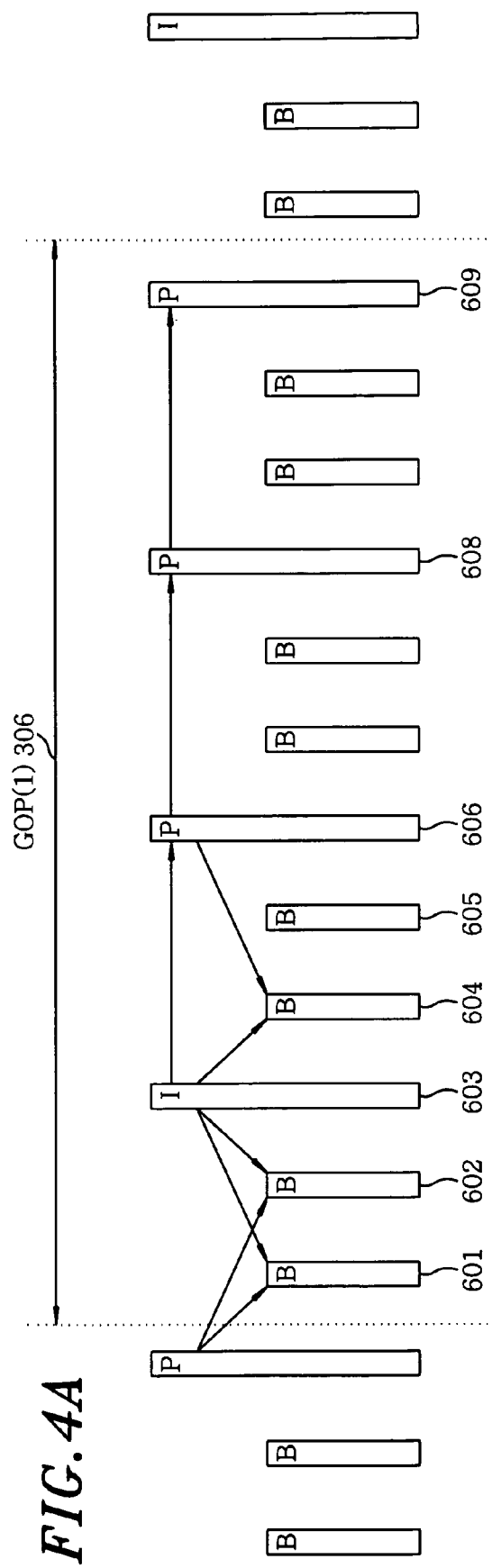
FIGS. 4A and 4B illustrate an exemplary format of a GOP.
Figure 4B:
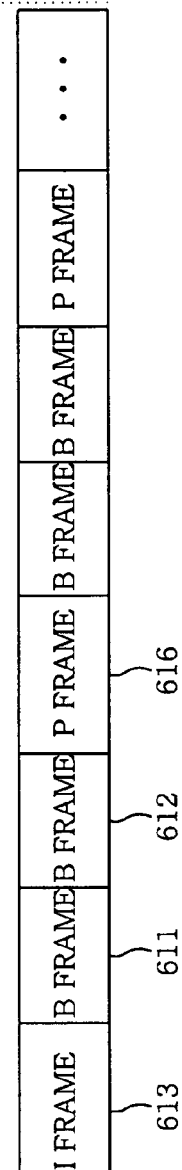

Each GOP, for example, GOP (1) 306, includes 12 frame data 611 to 617. FIGS. 4A and 4B show an exemplary format of GOP (1) 306. FIG. 4A depicts a display order of frames while FIG. 4B represents a bit stream order of the frames. In the display order in FIG. 4A, one GOP (1) 306 includes 12 frames, i.e., B frame 601 to P frame 609. P frame 606 is predictive-encoded by using I frame 603 as a reference frame. Further, P frame 608 is predictive-encoded by using P frame 606 as a reference frame. On the contrary, B frames 604 and 605 are respectively predictive-encoded by using I frame 603 and P frame 606 as reference frames.

In order to reduce the amount of a memory required to perform encoding or decoding, the frames in the display order of FIG. 4A are reordered on encoding to have a bit stream order such as the bit stream order of FIG. 4B so that the frames are recorded in the order of encoded data 613 of I frame 603, encoded data 611 of B frame 601, encoded data 612 of B frame 602 and encoded data 616 of P frame 606.

The minimum time length of each VOBU recorded herein is determined on the basis of the recording mode representing the recording time onto recording medium 105. As shown in Table 3, the longer the recording time mode is, the longer the minimum time length of each VOBU becomes. For example, by setting the minimum time length of each VOBU to be 1 second in 16 hours recording mode, a storage capacity of the VOBU map information requires only 170 Kbytes; and, therefore, the remained storage capacity can be used to record the audio and the video signals.

Further, the minimum time length T of each VOBU can be also calculated from the formula: $T=R/C \times d$ where C denotes a storage capacity of VOBU map information, d denotes the data size of the map information corresponding to each VOBU and R denotes the recording time.

Embodiment 2

Figure 6:
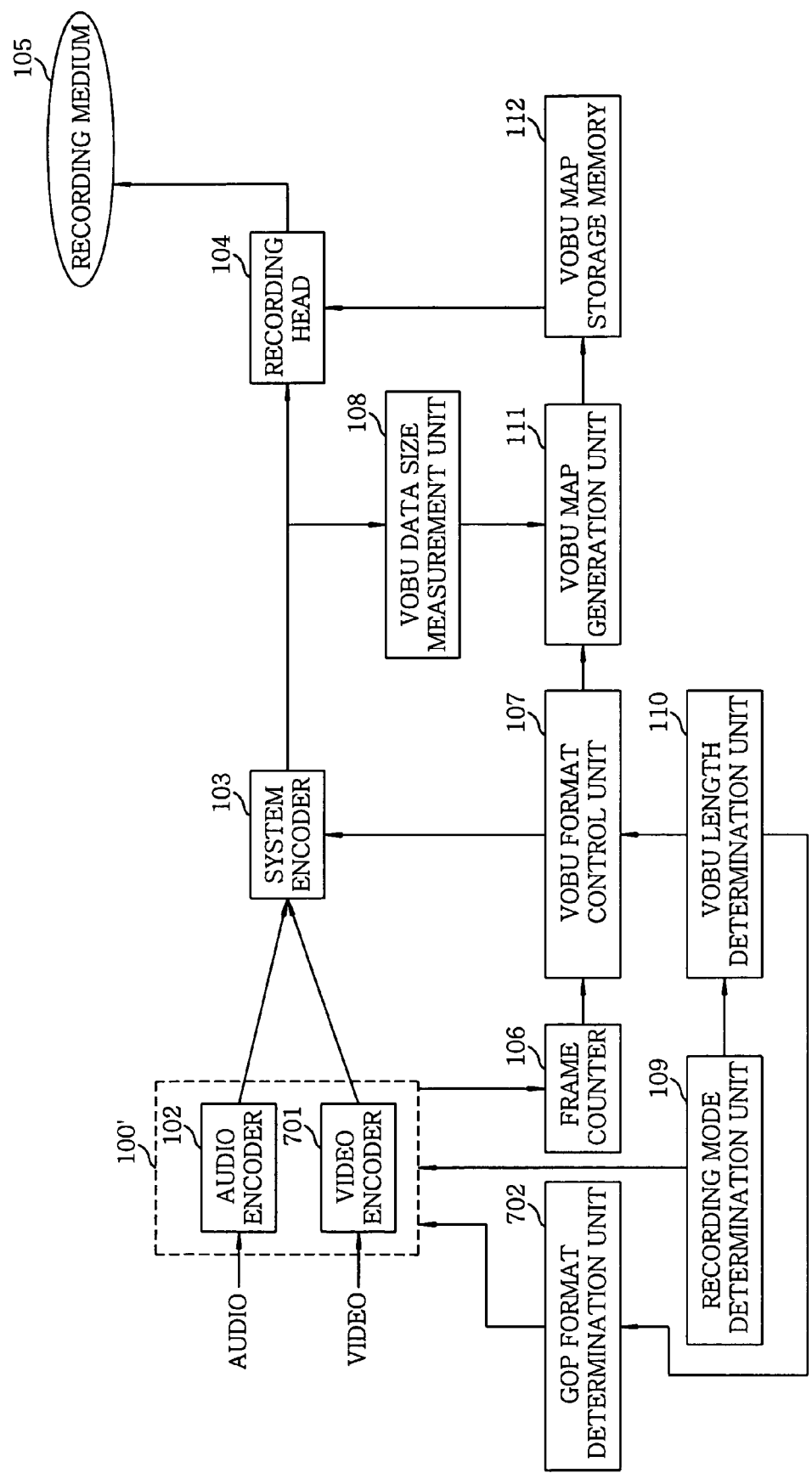
FIG. 6 is a block diagram for explaining a recording apparatus of an embodiment 2 in accordance with the present invention.

FIG. 6 is a block diagram for explaining a recording apparatus of an embodiment 2.

The recording apparatus in FIG. 6 is identical to that of the embodiment 1 except GOP format determination unit 702 and an operation of video encoder 701 in encoder 100'.

GOP format determination unit 702 determines a format of each GOP based on the minimum time length of each VOBU determined by the recording mode. Video encoder 701 carries out encoding based on the determined GOP format.

FIGS. 7A and 7B, respectively, illustrate exemplary VOBU configurations. FIG. 7A describes a case where the minimum time length of each VOBU is set to be 0.5 seconds. In this case, one VOBU includes one GOP which has 15 frames.

Next, FIG. 7B describes a case where the minimum time length of each VOBU is set to be 0.75 seconds. Here, one VOBU includes 2 GOPs, a first GOP having 15 frames and a second having 8 frames. That is, one VOBU is composed of 23 frames. Since NTSC signals run at 30 frames per second, a reproduction time length of one VOBU becomes 0.767 seconds, which satisfies the requirement on the minimum time length of each VOBU to be 0.75 seconds.

As discussed above, by determining the GOP format in accordance with the minimum time length of each VOBU determined by the recording mode, it is possible to generate a VOBU whose reproduction time length is equal to or greater than the minimum time length of each VOBU. Therefore, a recording of video signals in a long play mode can be realized without increasing a size of VOBU map storage memory 112.

Although the above example shows a case where every third frame is a P frame having two B frames inbetween, it should be noted that the present invention is not limited thereto. Further, although one VOBU includes one GOP in FIG. 7A, it can include two or more GOPs. Though one VOBU has been exemplified to include two GOPs in FIG. 7B, it can either include one GOP including 23 frames or more than three GOPs.

Embodiment 3

Figure 8:
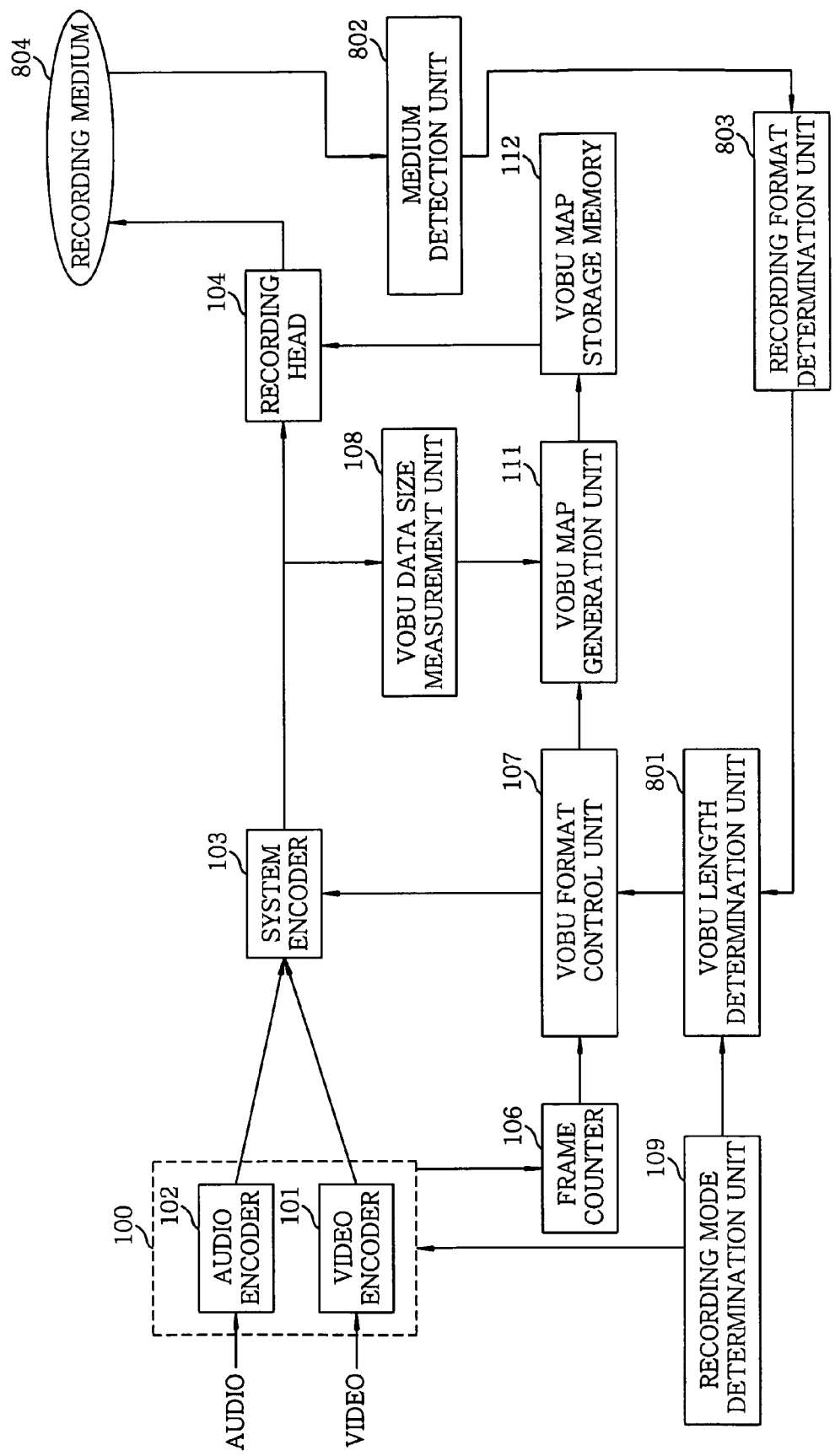
FIG. 8 shows a block diagram for explaining a recording apparatus of an embodiment 3 in accordance with the present invention.

FIG. 8 shows a block diagram for explaining a recording apparatus of an embodiment 3.

The recording apparatus in FIG. 8 is identical to that of the embodiment 1 except that the recording apparatus in FIG. 8 has VOBU length determination unit 801 which operates in a different way, medium detection unit 802 and recording format determination unit 803 such that the recording apparatus are capable of recording the input signals onto two or more different recording media 804 in different recording formats.

Medium detection unit 802 distinguishes types of recording media 804, for example, optical discs or the like, loaded in a disc drive. In order to detect the types of recording media 804, identification data recorded in an interior of a disc can be read out; and if otherwise, an intensity of a reflected light when a laser light is illuminated can be used.

Recording format determination unit 803 selects and determines a recording format in accordance with the types of the media.

VOBU length determination unit 801 determines the minimum time length of each VOBU based on the recording mode and the recording format. It is because there are differences in a maximum data size of VOBU maps due to differences of the recording formats defined on the basis of the types of the media. By defining the maximum data size of the VOBU maps based on the recording format and having a memory of the maximum data size installed in a reproduction apparatus as a VOBU map storage memory, a reproduction of the VOBU units recorded on the recording medium in the corresponding recording format can be ensured.

For example, in a DVD-VR (DVD video recording) format of a DVD-RAM medium, a maximum data size of VOBU maps is defined to be 214 Kbytes; and a data size of map information corresponding to each VOBU is defined to be 3 bytes. On the contrary, a DVD+VR (DVD video recording) format of a DVD+R/+RW medium defines a maximum number of VOBUs to be 40,959. Therefore, a maximum data size of VOBU maps can be 160 Kbytes if a data size of map information corresponding to each VOBU is set to be 4 bytes; and can be 120 Kbytes if the data size of map information corresponding to each VOBU is set to be 3 bytes.

VOBU length determination unit 801 determines the minimum time length of each VOBU by using the maximum data size of the VOBU map information defined in each recording format and using the recording mode. The minimum time length T of each VOBU can be calculated from the formula: $T=R/D \times d$ where D denotes a maximum data size of VOBU map information, d denotes the data size of the map information corresponding to each VOBU and R denotes the recording time.

Accordingly, by determining the minimum time length of each VOBU based on the recording format, a recording of video signals in a long play mode can be realized while employing different recording formats.

Embodiment 4

Figure 9:
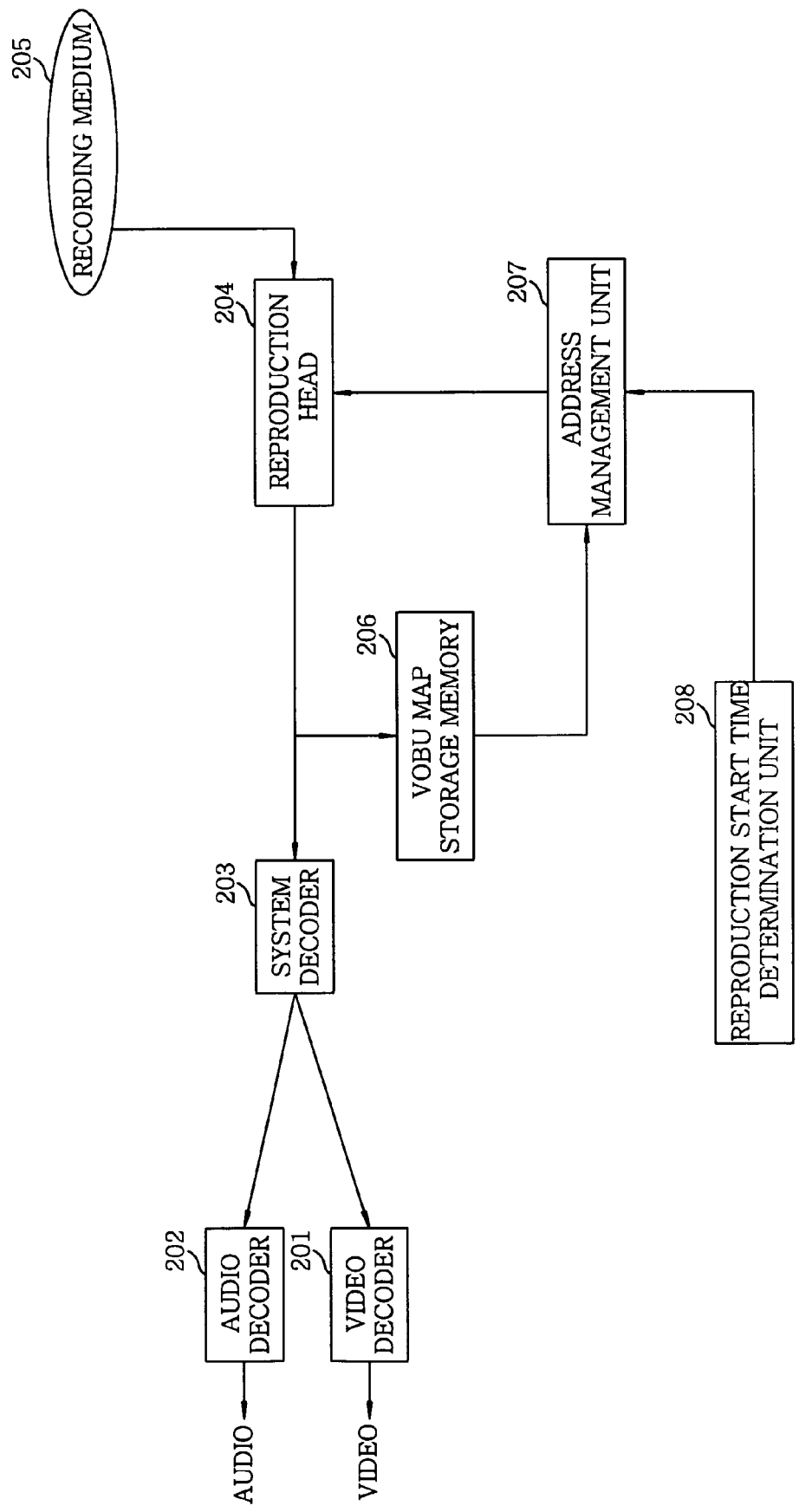
FIG. 9 illustrates a block diagram of a reproduction apparatus for explaining a reproduction method of an embodiment 4 in accordance with the present invention.

Referring to FIG. 9, there is illustrated a block diagram of a reproduction apparatus for explaining a reproduction method of an embodiment 4.

The reproduction apparatus includes video decoder 201, audio decoder 202, system decoder 203, VOBU map storage memory 206, address management unit 207 and reproduction start time determination unit 208; and reproduces data recorded in recording medium 205 by using reproduction head 204.

Recording medium 205 is a recording medium whose data is recorded on the basis of the recording format above described in FIGS. 2 and 3.

Before reading out VOBU data stored in recording medium 205, reproduction head 204 first reads out of VOBU .map information; and stores it in VOBU map storage memory 206; and then reads out the VOBU data corresponding to an address designated by address management unit 207.

Next, the VOBU data read out by reproduction head 204 is sent to system decoder 203. System decoder 203 demultiplexes a video and an audio stream from the inputted VOBU data to send them respectively to video decoder 201 and audio decoder 202. Video decoder 201 MPEG-decodes the video stream to generate a video signal while audio decoder 202 decodes the audio stream as specified in an MPEG Audio standard to output an audio signal.

The following explains how to randomly access video signals recorded in recording medium 205 to reproduce them. Reproduction start time determination unit 208 determines a reproduction start time that is measured from the beginning of the video signals. For example, the reproduction start time is determined by the requirement of a user. Address management unit 207 obtains a recording address of a VOBU corresponding to the start time of reproduction by using the reproduction start time from reproduction start time determination unit 208 and VOBU map information from VOBU map storage memory 206; and then informs it to reproduction head 204. Reproduction head 204 starts reading out corresponding VOBU data and thereby it is possible to reproduce the data from the determined reproduction start time.

Herein, a random access unit is determined on the basis of a recording mode of the data recorded in recording medium 205. The access unit is identical to a minimum time length of each VOBU that is recorded in VOBU map storage memory 206. As mentioned above, Table 3 illustrates the exemplary relationship between the recording mode and the minimum time length of each VOBU which is identical to the random access unit.

Therefore, by making the random access unit longer as the recording time becomes longer, it is possible to reproduce data recorded in a long play mode without increasing a size of VOBU map storage memory 206.

Further, a random access unit T can be calculated from the formula: T=R/m×d where m denotes a size of VOBU map storage memory 206, d denotes a data size of map information corresponding to each VOBU and R denotes a recording time.

Figure 10:
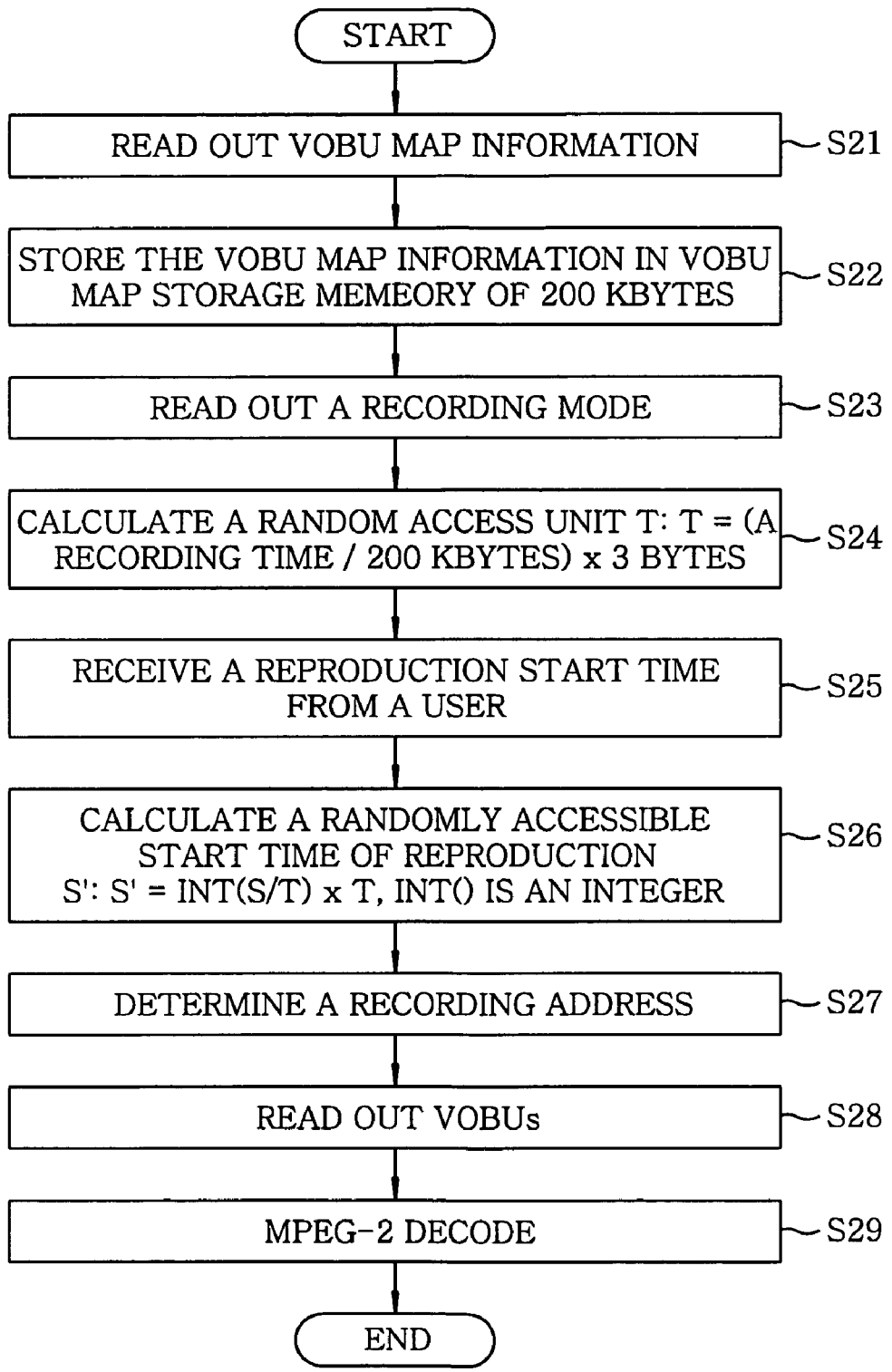
FIG. 10 shows a flow chart for explaining a reproduction method of the embodiment 4 in accordance with the present invention.

FIG. 10 is a flowchart for showing a random access reproduction process of the video signals in accordance with a reproduction method by using the random access unit T i.e., T=R/m x d. If the reproduction process of the data recorded in recording medium 205 is initiated, reproduction head 204 reads out the VOBU map information and stores it in VOBU map storage memory 206 (steps S21 and S22). After the recording mode recorded in recording medium 205 is read out in step S23, the random access unit T is determined in step S24. Namely, if the size of VOBU map storage memory 206 is set to be 200 Kbytes; and the data size of map information corresponding to each VOBU is set to be 3 bytes, the random access unit T can be calculated as follows: T=(the recording time/200 Kbytes)×3 bytes. In steps S25 and S26, reproduction start time determination unit 208 receives a reproduction start time S to obtain a randomly accessible start time of reproduction S'. The randomly accessible start time of reproduction S' can be calculated as follows: S'=INT(S/T)×T, where INT( ) means that it will return an integer. Next, address management unit 207 determines an address of a VOBU corresponding to the randomly accessible start time of reproduction S' from VOBU map storage memory 206 in step S27; and reproduction head 204 starts reading out of VOBU data that corresponds to the address from recording medium 205 in step S28. Video decoder 201 and audio decoder 202 decode the VOBU data of the corresponding VOBU to generate an MPEG-2 decoded reproduction signal in step S29.

As discussed above, in the recording and reproduction apparatus in accordance with the present invention, the video signals are encoded in compliance with an MPEG encoding standard. However, without being limited thereto, different encoding methods can be used.

An audio signal encoding method such as MPEG Audio Layer II encoding standards, Dolby AC-3 audio coding standards, AAC or MP3 encoding format or the like can be used, but not limited to thereto; another encoding method can be employed. An uncompressed audio format, e.g., linear PCM can be also adopted.

The system encoder is not limited to a system encoder using an MPEG-2 multiplexing method; but instead, another multiplexing method may be possibly employed.

Further, the input signal into the recording apparatus in the present invention can be a compressed/encoded stream. In this case, by reading out header information in encoded data of each frame, the number of frames is detected. By using a predetermined minimum time length of each data unit and the detected number of frames, the data unit is determined on the basis of GOPs. After measuring a data size of the determined data unit, time map information is generated by using reproduction time information determined from the number of frames (number of GOPs) and address information determined from the data size. As described above, the minimum time length of each data unit is determined on the basis of a recording mode onto a recording medium.

Further, since each VOBU in this embodiment includes one or more GOPs, each VOBU includes the smallest number of GOPs that makes each VOBU length not be shorter than the minimum time length of each VOBU by adding up the number of frames in GOPs. However, each VOBU can be made up such that an average length of VOBUs instead of the length of each VOBU is not smaller than the minimum time length. For example, one GOP is 0.4 seconds long if one GOP is made up of 12 frames. If the minimum length of each VOBU is set to be 1 second, one VOBU must include 3 GOPs and the reproduction time length of one VOBU becomes 1.2 seconds. However, if an average time length of VOBUs is set to be 1 second, neighboring VOBUs can be configured to include 2 and 3 GOPs alternately. Since the average length of reproduction time of one VOBU is 1 second, the desired effect that a random access unit can be shorten without overflowing a memory for recording time map information can be obtained.

Further, while the video and the audio signal have been exemplified as the input signal in the preferred embodiments, it should be noted that the input signal can either be one of them or a data bit stream.

Furthermore, the recording mode is not limited to the above mentioned examples in the preferred embodiments. Any mode that determines a recording time, for example, a mode determining a recording time in second units, can be used.

An optical disc such as a DVD-RAM disc, a DVD-RW disc, a DVD-R disc, a DVD+RW disc, a DVD+R disc or the like can be used as a recording medium, but the present invention is not limited to this. Different types of recording media such as magnetic discs, semiconductor memories or the like can be also applicable.

Further, each unit of the recording and reproduction apparatus can be embodied in software. In this case, embodiments can be realized by executing program codes, and each unit can include software modules.

Further, though a VOBU has been exemplified as a recording data unit, the present invention is not limited to. Any unit based on time can be used.

The time length of each data unit having a period within a range from 0.5 to 1.0 seconds is desirable, but is not limited thereto.

Furthermore, though the encoding and decoding in the preferred embodiments has been described as being carried out on a frame basis, it is also possible to carry out encoding and decoding on a picture basis (frames, fields or a mixture of frames and fields as in MPEG).

As described above, the recording apparatus and method, the reproduction apparatus and method, and the recording medium thereof in accordance with the present invention can be applicable to cases where random access during reproduction is required or a recording of video signals in a long play mode is essential by determining a length of a recording data unit in accordance with a recording mode.

While the invention has been shown and described with respect to the preferred embodiments, it will be understood by those skilled in the art that various changes and modification may be made without departing from the scope of the invention as defined in the following claims.

What is claimed is:

1. A recoding hardware apparatus for recording an input signal on a data unit basis and management information of data units of the input signal onto a recording medium, the recording apparatus comprising:
   a recording mode determination unit for determining a recording mode representing a recording time of the input signal onto the recording medium; and
   a time length determination unit for determining a time length of each of said data units,
   wherein a minimum time length of each of said data units is determined by the recording mode and each of said data units is a random access unit, wherein the minimum time length of each of said data units is determined by the recording mode, a size of the memory for storing the management information of the data units and a size of the management information corresponding to each random access unit.

2. The apparatus of claim 1, further comprising a memory for storing the management information of the data units, wherein the management information includes information related to at least one of a reproduction time and a recording address of each of said data units.

3. The apparatus of claim 1, further comprising:
   a data unit formation unit for producing the data units, wherein each of said data units is composed of one or more subunits and each subunit includes multiple pictures; and
   an encoding unit for encoding the pictures in each subunit, wherein among the pictures in each subunit, at least one picture is intra-coded and the remaining pictures are inter-coded.

4. The apparatus of claim 3, wherein the number of pictures in each subunit is determined by the recording mode or the minimum time length of each of said data units.

5. The apparatus of claim 3, wherein each subunit is a GOP.

6. The apparatus of claim 3, wherein the picture includes frames and/or fields.

7. The apparatus of claim 1, further comprising a detection unit for detecting a type of the recording medium, wherein the minimum time length of each of said data units is determined by the type of the recording medium and the recording mode.

8. The apparatus of claim 1, wherein the minimum time length is a theoretical minimum time length determined according to the recording mode, the data units have different time lengths, and an average time length of the data units is equal to or greater than the theoretical minimum time length.

9. The apparatus of claim 1, wherein each of said data units is a VOBU (video object unit).

10. A recording method for recording an input signal on a data unit basis and management information of data units onto a recording medium, the recording method comprising the steps of:
    determining a recording mode representing a recording time of the input signal onto the recording medium; and
    determining a time length of each of said data units by a computer processor,
    wherein a minimum time length of each of said data units is determined by the recording mode and each of said data units is a random access unit, wherein the minimum time length of each of said data units is determined by the recording mode, a size of the memory for storing the management information of the data units and a size of the management information corresponding to each random access unit.

11. The apparatus of claim 10, wherein said each of said data units is a VOBU (video object unit).

12. A non-transitory recording medium for recording an input signal on a data unit basis and management information of data units, wherein a minimum time length of each of said data units is determined by a recording mode representing a recording time of the input signal and each of said data units is a random access unit, wherein the minimum time length of each of said data units is determined by the recording mode, a size of the memory for storing the management information of the data units and a size of the management information corresponding to each random access unit.

13. A reproduction hardware apparatus for reproducing an input signal from a recording medium, wherein the recording medium stores the input signal on a data unit basis and management information of data units of the input signal, the reproduction apparatus comprising:
    a detection unit for detecting a recording mode representing a recording time of the input signal onto the recording medium; and
    a reproduction start time determination unit for determining a reproduction start time by executing random-access,
    wherein the input signal is reproduced by randomly accessing the data units based on a minimum time length of each of said data units determined by the recording mode and said each data unit is a random access unit, wherein the minimum time length of each of said data units is determined by the recording mode, a size of the memory for storing the management information of the data units and a size of the management information corresponding to each random access unit.

14. The apparatus of claim 13, wherein said each of said data units is a VOBU (video object unit).

15. A reproduction method for reproducing an input signal stored on a data unit basis with management information of the data units on a recording medium, comprising the steps of determining a minimum time length of each of said data units by a recording mode representing a recording time of the input signal by a computer processor, and reproducing the input signal by randomly accessing the data units based on said minimum time length of each of said data units, wherein each of said data units is a random access unit, wherein the minimum time length of each of said data units is determined by the recording mode, a size of the memory for storing the management information of the data units and a size of the management information corresponding to each random access unit.

* * * * *